United States Patent [19]

Hall

[11] Patent Number: 5,384,976
[45] Date of Patent: Jan. 31, 1995

[54] PILE WEATHERSTRIP

[75] Inventor: Alfred B. Hall, Shildon, England

[73] Assignee: Linear Limited, England

[21] Appl. No.: 969,160

[22] Filed: Apr. 5, 1993

[30] Foreign Application Priority Data

Jun. 13, 1991 [GB] United Kingdom ............. 9112780

[51] Int. Cl.$^6$ ............................................. E06B 7/16
[52] U.S. Cl. ................................. 49/489.1; 49/475.1; 428/95
[58] Field of Search ............... 49/489.1, 493.1, 475.1; 300/21, 5; 428/85, 88, 90, 95, 96

[56] References Cited

U.S. PATENT DOCUMENTS

| 1,825,145 | 9/1931 | Dressler | 300/21 |
| 2,576,546 | 11/1951 | Starr | 300/21 |
| 2,994,929 | 8/1961 | Kessler . | |
| 3,266,190 | 8/1966 | Jackson | 49/489.1 |
| 3,404,487 | 10/1968 | Johnson | 49/489.1 X |
| 3,456,410 | 7/1969 | Olson et al. | 49/489.1 X |
| 3,935,043 | 1/1976 | Kessler | 49/489.1 X |
| 4,148,953 | 4/1979 | Horton | 49/489.1 X |
| 4,164,599 | 8/1979 | Kessler . | |
| 4,198,453 | 4/1980 | Olson | 49/489.1 X |
| 4,699,818 | 10/1987 | Evans et al. . | |
| 4,713,130 | 12/1987 | Evans et al. | 428/95 X |
| 4,970,829 | 11/1990 | Brautigam | 49/489.1 |

Primary Examiner—Peter M. Cuomo
Assistant Examiner—Jerry Rediman
Attorney, Agent, or Firm—Testa, Hurwitz & Thibeault

[57] ABSTRACT

A pile weatherstrip has an elongate base strip carrying a pile of thermoplastic fibres. A zone is formed adjacent the base of the fibres fused together and compressed to reduce their width. This provides a comparatively smooth and narrow zone that does not snag on the flanges of a carrier as the pile weatherstrip is inserted into the carrier. The zone can be produced by passing the weatherstrip through a nip formed by heated rollers. In an alternative embodiment, the fibres are fused together for their whole height. This has the additional advantage of providing an air-impervious barrier.

16 Claims, 2 Drawing Sheets

PILE WEATHERSTRIP

BACKGROUND OF THE INVENTION

The invention relates to pile weatherstrip and to methods for the manufacture of pile weatherstrip.

Pile weatherstrip commonly comprises an elongate base strip carrying a pile of thermoplastic fibres, such as polypropylene fibres. The fibres extend across the strip and along the strip but the width of the pile is not as great as the width of the strip so that the strip extends to either side of the pile.

In use, the pile weatherstrip is held by a channel-section carrier which has a base, upstanding side walls and inwardly directed flanges at the ends of the side walls. The width of the base is generally the width of the base strip and the gap between the ends of the flanges is generally the width of the pile. Thus, as the base strip is slid into the channel, the edges of the base strip are held between the flanges and the base, while the pile projects through the gap between the flanges.

In general, such a weatherstrip can be inserted easily into such a channel by inserting one of the strip into one end of the channel and pushing the strip along the channel. It has been found, however, that particularly where the channel is of substantial length and is made of aluminium or plastics materials. It can be difficult to insert a pile weatherstrip into such a channel. It is believed that this is because individual fibres catch on the free ends of the flanges that define the gap through which the pile passes and this resists the insertion of the weatherstrip.

According to a first aspect of the invention there is provided a pile weatherstrip comprising an elongate base strip having spaced side edges and carrying a pile of thermoplastic fibres, the fibres extending across the strip and along the strip, with the pile having side edges spaced inwardly of the associated side edges of the base strip, at least the fibres at the side edges being fused together along the length of the weatherstrip and for at least a portion of the height thereof adjacent the base strip.

This fused zone is thus the zone adjacent the free ends of the flanges when the pile weatherstrip is inserted into a channel, The fusing ensures that the fibres do not catch on the free ends of the flanges during such insertion so making easier the insertion of such a weatherstrip into a long length of channel.

According to a second aspect of the invention there is provided a method of manufacturing a pile weatherstrip comprising forming a pile of thermoplastic fibres on an elongated base strip having side edges with the fibres extending across the strip and along the strip and with the pile having side edges spaced inwardly of the respective adjacent side edges of the pile, and then fusing together along the length of the pile at least the thermoplastic fibres at the side edges of the pile for at least a portion of the height thereof adjacent the base strip.

BRIEF DESCRIPTION OF THE DRAWINGS

The following is a more detailed description of some embodiments of the invention, by way of example, reference being made to the accompanying drawings in which.

DETAILED DESCRIPTION OF THE PREFERRED EMBODIMENT

Figure 1:
FIG. 1 is a schematic cross-sectional view of a pile weatherstrip formed from an elongate base strip and an upstanding pile of thermoplastic fibres.

Referring first to FIG. 1, the pile weatherstrip comprises an elongate base strip 10 carrying a pile of thermoplastic fibres 11. The fibres extend across the strip and along the strip. As seen in FIG. 1, the pile of fibres 11 is disposed about the center line of the strip 10 and has a width which is less than the width of the strip 10. Thus the pile has side edges that are parallel to, but spaced inwardly of, the associated side edges of the base strip 10.

The pile weatherstrip may be produced by any known method for example by weaving or tufting the fibres 11 into a woven base strip 10. The fibres 11 may be of any suitable thermoplastic material such as polypropylene.

Figure 2:
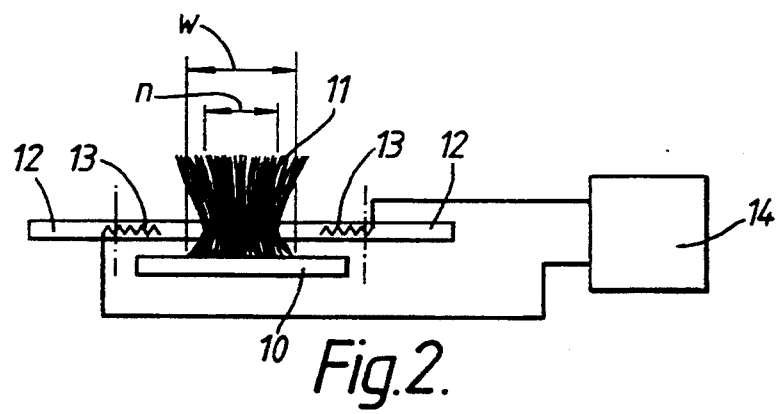
FIG. 2 shows the pile weatherstrip of FIG. 1 being passed between a pair of heated rollers to fuse and compress the fibres at a point adjacent the base strip.

Referring next to FIG. 2, one method of modifying the fibres comprises passing a pile weatherstrip through a nip formed between a pair of rollers 12 rotatable about respective parallel axes 16 extending normal to the length of the strip 10. The width of the nip n is less than the width of the pile w at the base strip 10.

As seen in FIG. 2, the nip is arranged close to the base strip 10.

The rollers contain electrical heating elements 13 which are supplied with electrical power from a power source 14. The elements 13 are such that the surfaces of the rollers are heated to a temperature close to the melting point of the fibres 11. Next, the pile weatherstrip is passed through the nip.

This causes the melted fibres of the pile 11 to fuse together. This fusing extends continuously along both side edges of the pile 11 to form solid "walls" adjacent the base strip 10 of the weatherstrip. Thus, along the sides, each fibre is separate from its neighbours at the base 10 and is then fused to its neighbours in a zone adjacent the base strip 10 before being separate again at its free end.

Since this fusing occurs within the nip of the rollers 12, the fusing has the effect of constricting the fibres that is to say, it prevents the fibres splaying-out. There is thus formed a zone 15 of reduced width extending along the length of the pile 11 adjacent the base strip 10.

The extent of the fusing in a direction across the width of the pile will vary with the operating parameters such as the temperature to which the fibres are heated, the speed of travel of the weatherstrip and the width of the pile. Only the fibres at or adjacent the sides of the pile may be fused or the fusing may extend across the whole, or across substantially the whole of the width of the pile.

Figure 3:
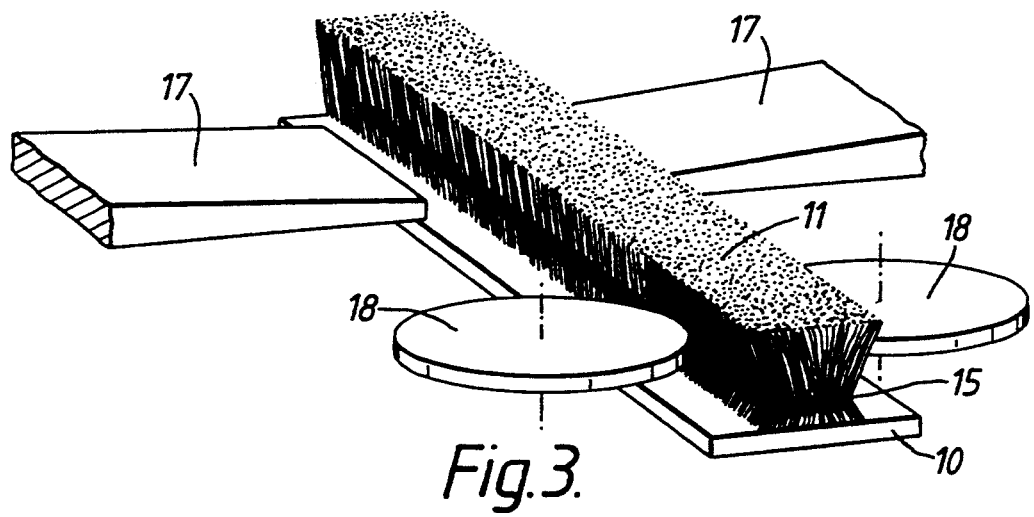
FIG. 3 shows the pile weatherstrip of FIG. 1 heated adjacent the base strip by ultrasonic heating means and then compressed between a pair of rollers.

An alternative method for producing such a zone 15 is shown in FIG. 3. In this case, the pile weatherstrip is passed between two components of an ultrasonic heating device 17 which raises the temperature of the fibres 11, in the zone adjacent the base strip 10, to a temperature at which the fibres melt and fuse together. Whilst still in this heated state, the zone of the fibres is passed between two rollers 18 which, like the rollers 12 of FIG. 2, form a nip whose width is less than the width of the pile at the base strip 10. Thus, there is again produced a zone 15 of reduced width adjacent the base strip 10 whose width is less than the width of the fibres at the base strip 10. Again, the fibres need not be fused across the whole width of the weatherstrip, only the fibres along the side edges of the pile may be fused.

In both cases, the rollers 12,18 may be adjustable to vary the spacing n between them and so vary the width of the zone 15.

Figure 4:
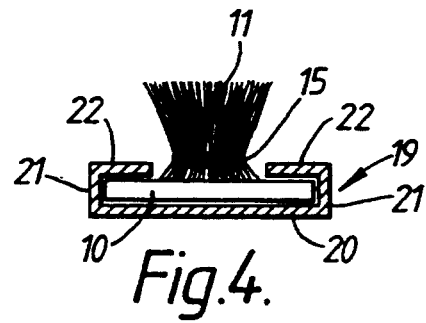
FIG. 4 shows a pile weatherstrip with a zone of fused fibres extending along the length of the pile and inserted in a channel section carrier.

Referring next to FIG. 4, in use such a pile weatherstrip is inserted into a channel-section carrier 19 comprising a base 20, upstanding side walls 21 and inwardly directed flanges 22. The spacing of the free ends of the flanges 22 is generally similar to the width of the fibres 11 of the base strip 10. In a pile weatherstrip of the kind described above with reference to the drawings, the zone 15 is positioned to be level with these flange ends 22 when the weatherstrip is inserted into the carrier 19. The fusing of the fibres 11 in this zone 15 ensures that the fibres do not catch on the ends of the flanges 22. In addition, the reduced width of the pile at this zone also helps to ensure easy insertion of the weatherstrip into the carrier 19.

The ratio between the width of the zone 15 and the gap between the ends of the flanges 22 can be varied as required. In one example, however, a weatherstrip with a base strip width of 6.7 mm could have a zone 15 with a width of 2.5 mm to 3.5 mm when the gap between the flanges 22 of an associated carrier 19 is 4.6 mm.

Figure 5:
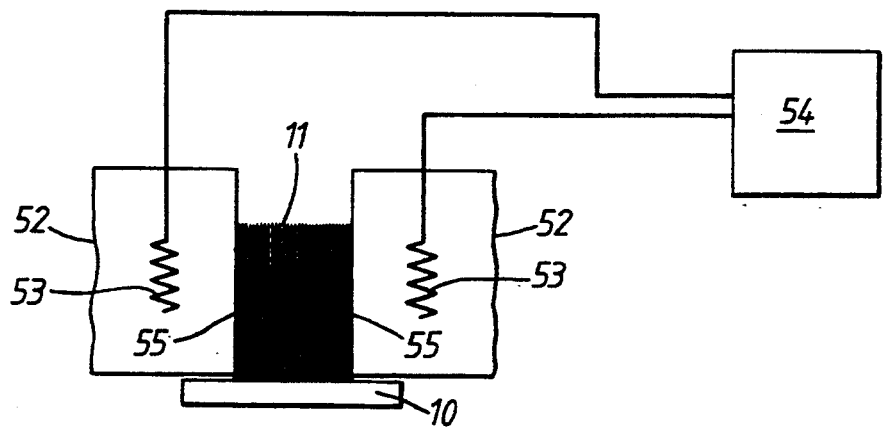
FIG. 5 shows the pile weatherstrip of FIG. 1 being passed between a pair of heated rollers to fuse and compress the fibres over their whole height.
Figure 6:
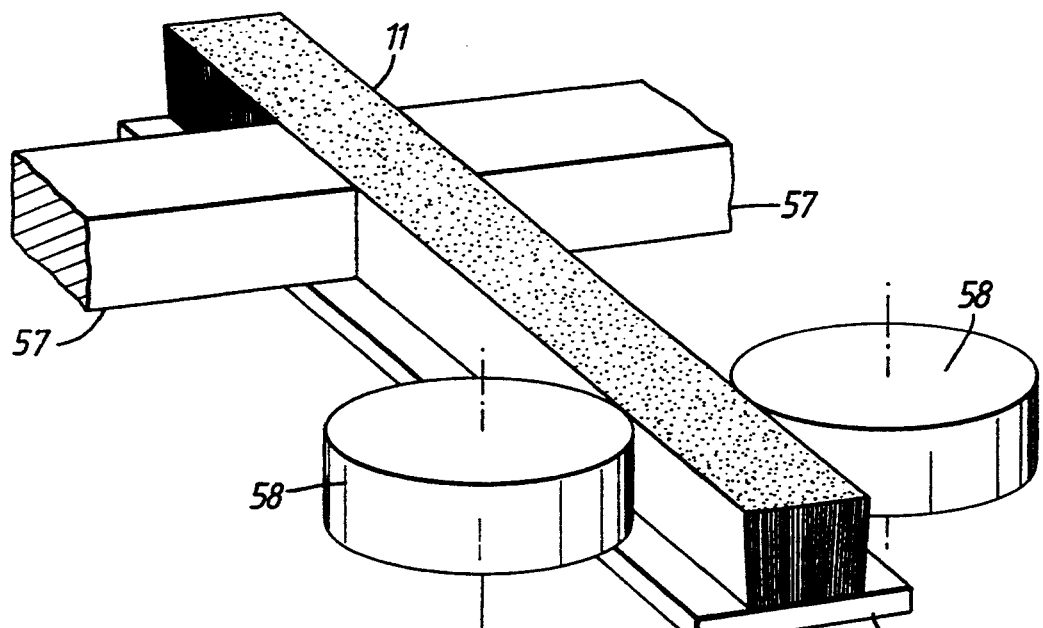
FIG. 6 shows the pile weatherstrip of FIG. 1 heated over their whole height by ultrasonic heating means and then compressed between a pair of rollers.

A second modification to the fibres is shown in FIGS. 5 and 6. In this modification the fibres of the weatherstrip of FIG. 1 are fused for the whole of their height. This produces a wall of fused fibres extending along each edge of the pile 11. This has the benefit of easing insertion of the weatherstrip into a channel and also produces a solid barrier against dust and air. In addition, the pile is kept fully upright to maintain sealing effectiveness. It has been found that the flexibility of the pile is not impaired to any significant extent.

In the method of FIG. 5, the pile weatherstrip 10,11 is passed between a pair of heated rollers 52. The spacing between these rollers 52 is, as seen in FIG. 5, generally equal to the width of the pile 11.

The rollers 52 have an outer surface 55 whose axial length is greater than the height of the pile 11.

Each roller 52 contains an electrical heating element 53 heated by a power source 54.

As the pile weatherstrip 10,11 passes between the rollers 52, the fibres of the pile in the zones adjacent the lateral edges of the pile 11 are heated and fused together by the rollers 52 over their whole height. This forms two "walls" of solid fused fibres extending over the whole height of the pile 11 and along the whole length of the weatherstrip.

In the alternative method of FIG. 6, the pile weatherstrip is passed between two components of an ultrasonic heating device 57 which raises the temperature of the fibres of the pile 11 to a temperature at which the fibres melt and fuse together. The dimensions of the heating device 57 are such that the melting and fusing extend over the whole height of the pile 11.

While still in this heated state, the fibres are passed through a nip between two rollers 58. The width of the nip is generally equal to the width of the pile 11. The rollers 58 thus produce a wall of fused fibres extending over the whole height of the pile 11 and along the whole length of the weatherstrip.

In both embodiments this constrains the fibres of the pile 11 and prevents them splaying-out so that the width of the pile 11 is substantially the same at the top of the pile 11 as the width of the pile adjacent the base strip 10. This has the advantages set out above.

In all the methods described above with reference to the drawings, both the speed of travel of the pile weatherstrip during fusing and the fusing temperature will depend on the material of the fibres and other factors. For polypropylene fibres typical temperatures and speeds may be 325° C. at 30 meters/minute or 200° C. at 10 meters/minute.

It will be appreciated that the methods described above for production of the pile weatherstrip shown in FIGS. 4 and 6 are examples of only two such methods. There are other methods which could be used. For example the pile could be heated with hot air; hot wires or lasers or any other suitable heat source.

It is hereby claimed:

1. A pile weatherstrip comprising an elongate base strip having a first pair of side edges and carrying a pile of thermoplastic fibres, the fibres extending across the base strip and along a length of the base strip and to a height above the base strip, with the pile having a second pair of side edges spaced inwardly of the first pair of side edges of the base strip, at least the fibres at the second pair of side edges being fused together along the length of the base strip and only for a portion of the height of the fibres which is spaced above the base strip such that each fibre at the second pair of side edges is separate from its neighbours at the base strip and is then fused to its neighbours for the portion of the height of the fibres which is spaced above the base strip.

2. A weatherstrip according to claim 1 wherein a first width of the pile is less than a second width of the pile, the first width of the pile being measured between the fibres that are fused together at one side edge of the second pair of side edges and the fibres that are fused together at the other side edge of the second pair of side edges, and the second width of the pile being measured between the second pair of side edges at the base strip.

3. A weatherstrip according to claim 1 or claim 2 wherein only the fibres adjacent the second pair of side edges of the pile are fused together.

4. A weatherstrip according to claim 1 or claim 2 wherein substantially all of the fibres between the second pair of side edges are fused together along the length of the base strip and only for the portion of the height of the fibres which is spaced above the base strip.

5. A method of manufacturing a pile weatherstrip comprising forming a pile of thermoplastic fibres on an elongated base strip having a first pair of side edges, with the fibres extending across the base strip and along a length of the base strip and to a height above the base strip, with the pile having a second pair of side edges spaced inwardly of the first pair of side edges of the base strip, and then fusing together along the length of the base strip at least the fibres at the second pair of side edges of the pile for only a portion of the height of the fibres which is spaced above the base strip such that each fibre at the second pair of side edges is separate from its neighbours at the base strip and is then fused to its neighbours for the portion of the height of the fibres which is spaced above the base strip.

6. A method according to claim 5 wherein the fibres are fused by heating at least the portion of the height of the fibres which is spaced above the base strip to a fusing temperature and constraining at least that portion to a first width of the pile measured between the fibres that are fused together at one side edge of the second pair of edges and the fibres that are fused together at the other side edge of the second pair of side edges.

7. A method according to claim 6 and comprising constraining the pile to the first width which is less than a second width of the pile measured between the second pair of side edges at the base strip.

8. A method according to claim 7 comprising heating the pile and subsequently constraining the pile.

9. A method according to claim 6 or claim 7 and comprising heating and constraining the pile simultaneously.

10. A method according to any one of claims 5, 6 or 7 and comprising moving the weatherstrip relative to means for heating the fibres to a fusing temperature.

11. A method according to claim 10 wherein the fibres are of polypropylene, the weatherstrip being moved at a speed of 30 meters/minute and the fusing temperature being 325° C.

12. A method according to claim 10 wherein the fibres are of polypropylene, the weatherstrip being moved at a speed of 10 meters/minute and the fusing temperature being 200° C.

13. A method of manufacturing a pile weatherstrip comprising:
    forming a pile of thermoplastic fibres on an elongated base strip having a first pair of side edges, with the fibres extending across the base strip and along a length of the base strip and to a height above the base strip, with the pile having a second pair of side edges spaced inwardly of the first pair of side edges of the base strip; and then
    fusing together along the length of the base strip at least the fibres at the second pair of side edges of the pile for only a portion of the height of the fibres which is spaced above the base strip such that each fibre at the second pair of side edges is separate from its neighbours at the base strip and is then fused to its neighbours for the portion of the height of the fibres which is spaced above the base strip, wherein the fibres are fused by simultaneously:
    heating at least the portion of the height of the fibres which is spaced above the base strip to a fusing temperature, and
    constraining at least that portion to a first width of the pile measured between the fibres that are fused together at one side edge of the second pair of edges and the fibres that are fused together at the other side edge of the second pair of side edges, the first width being less than a second width of the pile measured between the second pair of side edges at the base strip,
    wherein the fusing step includes moving the weatherstrip relative to a pair of heated rollers, each roller contacting a different one of the second pair of side edges of the pile to heat and fuse at least the portion of the height of the fibres which is spaced above the base strip and to constrain at least that portion to the first width.

14. A method of manufacturing a pile weatherstrip comprising:
    forming a pile of thermoplastic fibres on an elongated base strip having a first pair of side edges, with the fibres extending across the base strip and along a length of the base strip and to a height above the base strip, with the pile having a second pair of side edges spaced inwardly of the first pair of side edges of the base strip; and then
    fusing together along the length of the base strip at least the fibres at the second pair of side edges of the pile for only a portion of the height of the fibres which is spaced above the base strip such that each fibre at the second pair of side edges is separate from its neighbours at the base strip and is then fused to its neighbours for the portion of the height of the fibres which is spaced above the base strip, wherein the fibres are fused by:
    heating at least the portion of the height of the fibres which is spaced above the base strip to a fusing temperature, and then subsequently
    constraining at least that portion to a first width of the pile measured between the fibres that are fused together at one side edge of the second pair of edges and the fibres that are fused together at the other side edge of the second pair of side edges, the first width being less than a second width of the pile measured between the second pair of side edges at the base strip,
    wherein the fusing step includes moving the weatherstrip relative to a heating device which heats at least the portion of the height of the fibres which is spaced above the base strip to said fusing temperature, the weatherstrip then being moved relative to constraining means which constrains at least that portion to the first width.

15. A method according to claim 14 wherein the heating device is an ultrasonic heating device and wherein the constraining means comprises a pair of rollers forming a nip between which at least the portion of the height of the fibres which is spaced above the base strip is passed to constrain at least that portion to the first width.

16. A method of manufacturing a pile weatherstrip comprising:
    forming a pile of thermoplastic fibres on an elongated base strip having a first pair of side edges, with the fibres extending across the base strip and along a length of the base strip and to a height above the base strip, with the pile having a second pair of side edges spaced inwardly of the first pair of side edges of the base strip; and then
    fusing together along the length of the base strip at least the fibres at the second pair of side edges of the pile for only a portion of the height of the fibres which is spaced above the base strip such that each fibre at the second pair of side edges is separate from its neighbours at the base strip and is then fused to its neighbours for the portion of the height of the fibres which is spaced above the base strip, wherein the fibres are fused by simultaneously:
    heating at least the portion of the height of the fibres which is spaced above the base strip to a fusing temperature, and
    constraining at least that portion to a first width of the pile measured between the fibres that are fused together at one side edge of the second pair of edges and the fibres that are fused together at the other side edge of the second pair of side edges, wherein the fusing step includes moving the weatherstrip relative to a pair of heated rollers, each roller contacting a different one of the second pair of side edges of the pile to heat and fuse at least the portion of the height of the fibres which is spaced above the base strip and to constrain at least that portion to the first width.

* * * * *